(12) United States Patent
Zhang et al.

(10) Patent No.: US 8,914,265 B2
(45) Date of Patent: Dec. 16, 2014

(54) GAS TURBINE MODEL AND A METHOD FOR THE MODELING OF A GAS TURBINE

(75) Inventors: Xiao-Yi Zhang, Niederrohrdorf (CH); Anton Nemet, Lengnau (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/081,007

(22) Filed: Apr. 6, 2011

(65) Prior Publication Data

US 2011/0224959 A1    Sep. 15, 2011

Related U.S. Application Data

(63) Continuation of application No. PCT/EP2009/063175, filed on Oct. 9, 2009.

(30) Foreign Application Priority Data

Oct. 17, 2008   (EP) .................................. 08105594

(51) Int. Cl.
*G06G 7/48*          (2006.01)
*G05B 17/02*         (2006.01)

(52) U.S. Cl.
CPC ....................................... *G05B 17/02* (2013.01)
USPC ............................................................ 703/7

(58) Field of Classification Search
CPC .................................................... G06F 17/5018
USPC .................... 703/2, 6, 7; 700/29, 287; 60/775
See application file for complete search history.

(56) References Cited

U.S. PATENT DOCUMENTS

| 4,928,484 A * | 5/1990 | Peczkowski ..................... 60/240 |
| 7,062,370 B2 * | 6/2006 | Vhora et al. .................. 701/100 |
| 7,219,040 B2 * | 5/2007 | Renou et al. ....................... 703/6 |
| 2004/0000144 A1 | 1/2004 | Rajamani et al. |

FOREIGN PATENT DOCUMENTS

| EP | 2177963 | 4/2010 |
| WO | WO2010/043563 | 4/2010 |

OTHER PUBLICATIONS

"Laplace transform applied to differential eqations", Wikipedia http://en.wikipedia.org/wiki/Laplace_transform_applied_to_differential_equations, retreived Jan. 20, 2012, 2 pages.*
Piroska Ailer et al., Nonlinear Model-Building of a Low-Power Gas Turbine, 2001, Periodica Polytchnica ser. Transp. Eng. vol. 29, No. 1-2, pp. 117-135.*
T.V. Breikin, V.Y. Arkov, G.G. Kulikov, Regularisation approach for real-time modelling of aero gas turbines, Control Engineering Practice, vol. 12, Issue 4, Apr. 2004, pp. 401-407.*

(Continued)

*Primary Examiner* — Dwin M Craig
*Assistant Examiner* — Luke Osborne
(74) *Attorney, Agent, or Firm* — Buchanan Ingersoll & Rooney PC

(57) ABSTRACT

Numerical gas turbine models permit transient modeling with high precision and at the same time numerically efficient processes for modeling a gas turbine. A gas turbine model includes a plurality of sub models. These sub models are either purely dynamic or static, which allows significant simplifications in the numerical solution of the overall model. System parts, which simulate the effects of volumes, metal masses, of actuators, and of measuring systems are regarded as dynamic. The remaining system parts are regarded as static over a time characteristic.

14 Claims, 1 Drawing Sheet

(56) References Cited

OTHER PUBLICATIONS

Holdsworth, L., et al., "Direct solution method for initialising doubly-fed induction wind turbines in power system dynamic models," IEE Proceedings: Generation, Transmission and Distribution, Institution of Electrical Engineers, GB, vol. 150, No. 3, May 13, 2003, pp. 334-342.

Rabelo, B., et al., "Emulation of the static and dynamic behaviour of a wind-turbine with a DC-machine drive," Power Electronics Specialists Conference, 2004. PESC 04. 2004 IEEE 35th Annual Aachen, Germany Jun. 20-25, 2004, Piscataway, NJ, USA, IEEE, US, vol. 3, Jun. 20, 2004, pp. 2107-2112.

Zhai, Y-J., et al., "Fault Detection for Gas Turbine Based on Long-Term Prediction using Self-Organizing Fuzzy Neural Networks," Machine Learning and Cybernetics, 2007 International Conference on, IEEE, PI, Aug. 1, 2007, pp. 1120-1125.

Partial European Search Report for EP Patent App. No. 08105594.9 (May 18, 2009).

International Search Report for PCT Patent App. No. PCT/EP2009/063175 (Sep. 22, 2010).

\* cited by examiner

GAS TURBINE MODEL AND A METHOD FOR THE MODELING OF A GAS TURBINE

This application is a Continuation of, and claims priority under 35 U.S.C. §120 to, International application no. PCT/EP2009/063175, filed 9 Oct. 2009, and claims priority therethrough under 35 U.S.C. §§119, 365 to European application no. No. 08105594.9, filed 17 Oct. 2008, the entireties of which are incorporated by reference herein.

BACKGROUND

1. Field of Endeavor

The invention relates to a gas turbine model and to a method for the modeling of a gas turbine.

2. Brief Description of the Related Art

The accurate simulation of the statics and dynamics of a gas turbine (GT) process is becoming increasingly important for the manufacturers and operators of gas turbines. GT process models are used, inter alia, for studying machine transients, for designing, testing and checking control logics of the control system of a gas turbine, and for developing training simulators for gas turbines. Also partly used are "real-time" GT processes, which are executed simultaneously with an actual turbine on a computer and serve in particular for the measurement signal conditioning, the online diagnosis, the model-based protection of a gas turbine, and also the improvement of the performance of a closed loop control of a gas turbine.

It is known that a gas turbine has a thermodynamic process, which includes a heat and mass transfer and chemical reactions. The physical laws controlling this process are expressed by partial differential equations. As a controlled object, a gas turbine constitutes a time-variant, nonlinear and dynamic Multiple-Input/Multiple-Output system with distributed parameters. Typically there is no analytical solution for a set of partial differential equations, such as the state equations of a gas turbine. The equations therefore have to be solved numerically.

For example, by assuming a gas turbine to be a lumped parameter system, the process of a gas turbine can be described by normal differential equations, as shown in equations 1:

$$\dot{x}(t) = f(u(t), x(t), t)$$

$$y(t) = g(u(t), x(t), t) \quad \text{Equation 1,}$$

where t is the time, x(t) and $\dot{x}(t)$ are vectors of system states and their derivatives with respect to time, and where u(t) is the input vector of the system and y(t) is the output vector of the system.

During startup, the warm-up phase, and during significant load changes, a gas turbine is a time-variant system. Significant load changes, which lead to noticeable influence in this context, are typically larger than 10% relative load. For most applications they even need to be larger than 20% or 30% relative load in order to have a noticeable influence. After a few hours of steady state operation, a gas turbine can be regarded as time-invariant. Its state equations can then be described according to equation 2:

$$\dot{x}(t) = f(u(t), x(t))$$

$$y(t) = g(u(t), x(t)) \quad \text{Equation 2.}$$

To solve a set of nonlinear first-order differential equations, like equation 2, numerical methods, such as Gear Solver for example, are available. However, these methods require very complex numerical calculations. Furthermore, the identifying and verification of a model using these methods is difficult and time-consuming.

In order to reduce the solution complexity, the state equations of a gas turbine are normally simplified in order to form a linear or static model. The assumption of linearity is valid if the gas turbine works steady state close to a predefined operating point. The model error becomes greater if the gas turbine operates further away from this point or with fast transients. A static model cannot simulate the dynamics of the gas turbine process accurately.

Exemplary simplified gas turbine models are, for example, known from U.S. Pat. No. 7,219,040. Numerical solutions based on simplified linearized equations and complex nonlinear models are discussed.

SUMMARY

One of numerous aspects of the present invention includes a gas turbine model and a method for the modeling of a gas turbine, which permits static and transient modeling with high precision and, at the same time, a numerically efficient way to model a gas turbine. As a result, main process parameters, such as compressor exit pressure, turbine inlet temperature, turbine outlet temperature, mass flows, and rotor speed are obtained for different operating conditions. Further, real time simulations of a gas turbine process using this type of model are achievable.

Another aspect is based on the realization that substantial advantages can be achieved if a gas turbine model is separated or divided into a plurality of sub models. In particular in the case of separation of the modeling in virtual system parts, which are either dynamic or static, modeling can be substantially simplified. System parts at which the effects of volumes, metal masses, of actuators, and of measuring systems are simulated are to be regarded as dynamic. The remaining system parts are to be regarded as static.

In this context actuators or measuring systems are the combination of actuator and its respective measurement device with its signal processing and transmission units. For example in the case of the fuel injection, the transmission includes the signal transfer of the commanded fuel valve position, and its feedback loop.

Further, the effects of metal masses on the gas turbine dynamics are of secondary importance compared with those of the gas volumes, and of the actuators and measuring systems.

Furthermore, all dynamics of the gas turbine can be simplified as linear. In particular the dynamics of the actuators including servos (Variable Inlet Guide Vane control, fuel control valve) and the measuring instruments (speed, TAT=Temperature outlet temperature, compressor exit pressure or compressor plenum pressure pk2 measurements) can be assumed to be linear.

These assumptions and simplifications offer the possibility of splitting the overall model for the gas turbine into a plurality of sub models, which are distinguished as "only dynamic" or "only static" having the associated specific favorable numerical properties and are considerably easier to handle numerically. Furthermore, the quality of the results can also be optimized by the simplified calculation, as matching to actual measured data becomes much easier.

An important advantage is the simple and quick calculation, which can easily be performed by any conventional computer or controller. As a result, the model simulation can proceed simultaneously with an actual gas turbine and the effect of changes in input parameters on the operation of the gas turbine can be simulated in real time. Based on this, an optimized operation of the gas turbine can be achieved and on-line monitoring of the gas turbine process can be realized.

An embodiment of the invention, relates to a gas turbine model that includes at least one dynamic sub model, which simulates the dynamic influence of volumes, actuators, or measurement systems within the gas turbine process, and at least one static sub model, which simulates a gas turbine model disregarding its volumes or dynamics of actuators and measurements.

For example, at least one of the dynamic sub models can be a dynamic input sub model, which simulates the dynamic influence of volumes, dynamics of actuators and/or measuring systems within the gas turbine process to deliver an input variable for the static sub model based on a control variable of the gas turbine.

Further, to simulate the transient real or measured output variables based on the output variables of the static gas turbine sub model, at least one dynamic output sub model, which models the influence of volumes, actuators or measurement systems within the gas turbine, can be employed.

According to an embodiment of the present invention, at least one dynamic input sub model and at least one dynamic output sub model, which model the influence of volumes, actuators or measurement systems within the gas turbine, are employed in combination with at least one static gas turbine sub model.

According to a further embodiment of the present invention, the at least one dynamic input sub model and/or the dynamic output sub model can be designed in order to convert an input variable into an output variable by a linear functional relationship. In this way, a mathematical problem can be formulated for a partial aspect of the overall model, which is simple to solve numerically without having to take into account the quasi static part of the gas turbine process.

It is also favorable if the dynamic input and output sub models are designed in order to specify the relationship of an input variable and an output variable in the form of at least one linear differential equation, which can be solved by application of a Laplace transformation.

In the Laplace transformed domain the physical output variable is the result of single input/single output system and can be expressed by Laplace transfer function. The parameters of these transfer functions can be identified by step response tests. These tests are either carried out on the real engine or by a detailed dynamic model.

Furthermore, in another embodiment, the static gas turbine sub model can be designed in order to convert the input variable provided by the dynamic input sub model into an input variable of the dynamic output sub model using a nonlinear functional relationship. The nonlinear relationships required for the modeling of the gas turbine can be restricted to the static sub model(s). This leads to an overall model for the gas turbine, which can be executed very quickly.

In an embodiment of the present invention, the gas turbine model has two input sub models. The first provides a first input variable for the static gas turbine model, this input variable corresponding to a fuel mass flow. The second provides a second input variable for the static gas turbine model, this input variable corresponding to an angle of a variable inlet guide vane. By the modeling of these central input variables of a gas turbine process, a model, which has a high degree of exactness, can be achieved.

In another embodiment, the static gas turbine model can be designed in order to provide an output variable, which corresponds to a pressure at the compressor outlet using the first and second input variables. This output variable is one of the central variables in the gas turbine process. This output variable can also be used for subsequent arithmetic steps in the static model.

It is also an aspect, in a further embodiment, that the static gas turbine model is designed in order to provide a second output variable, which corresponds to the power output of the gas turbine using the first and second input variables and the output variables of the static gas turbine model.

In a further embodiment of the present invention, the static gas turbine model can be designed in order to provide a third output variable, which corresponds to the turbine outlet temperature after using the first and second input variables and the output variables of the static gas turbine model.

In a further embodiment the static model is designed as a quasi-stationary model, which is given as a function of the time. The time dependency simulates the influence of heat transfer into and out of metal masses, when these are heated up or cooled down during warm up or de-loading of the gas turbine. Since these are slow compared to the changes caused by gas volumes of control mechanism, their transient influence is at least one order of magnitude smaller then the influence of the later and their derivative with respect to time can be neglected. However, taking them into account for the steady state calculation increases the model precision.

In a further embodiment, in order to increase the accuracy of the values delivered by a model embodying principles of the present invention, the static gas turbine model can be designed in order to determine the output variables using correction terms, which depend for example on the ambient temperature, the pressure, the moisture, the speed of the gas turbine shaft, and the calorific value of the fuel. Further, when applicable, corrections for the water injection ratio of water into the combustor, the high-fogging water mass flow, the steam injection mass flow, and other variables influencing the gas turbine process can be added. These factors are important factors influencing the accuracy of the model. They are based on model predictions of detailed numerical models, or measurements, or a combination of both.

In another embodiment, compressor outlet pressure, turbine outlet temperature, and power output obtained by the static sub model are used as input for the respective output sub models to simulate the dynamics of the corresponding real and measured variables.

The power output can, for example, be used for real-time modeling during parallel operation of a gas turbine power plant model with an actual gas turbine in order to rapidly obtain the effects of changes of starting parameters of the gas turbine process on the output power of the gas turbine and to optimize the gas turbine operation. In particular, optimized power dispatch and reaction to frequency events of the power grid can be realized.

Further, where, simultaneously with the modeling of the gas turbine process, an actual gas turbine is controlled with at least one control parameter, a special advantage of a fast gas turbine model can be recognized. This results in particular from the fact that the changes at the control parameters can then be set in the model and the effects of these settings can be calculated without actually having to intervene in the gas turbine process and disturb the latter. As a result, optimum settings can be determined based on the model before imposing them on the real gas turbine. Settings can be adjusted or optimized with respect to different optimizing targets. These can, for example, be the speed of changes in power output, the exhaust temperature, cycle efficiency, lifetime consumption, or emissions. Control parameters can be signals from the controller such as, for example, the commanded fuel mass flow or variable inlet guide vane position, but also process values of the gas turbine such as pressures, temperatures, or mass flows, e.g., turbine inlet or outlet temperature.

In other words, a method for real time simulation of a gas turbine using a numerical model of a gas turbine for transient and steady state simulation, providing at least one process parameter, is used to adjust or determine control settings of the gas turbine. The model used for this method includes at least one dynamic sub model, which simulates the dynamic influence of volumes, actuators, and/or measurement systems, and/or rotor dynamics, and at least one static sub model, which simulates the gas turbine disregarding its volumes, dynamics of actuators, measurements, and rotor dynamics.

Further, the parallel modeling of a gas turbine can be used for monitoring and maintenance purposes. For example the deviations between model prediction and measured value can serve as an indication of the status of the gas turbine. If deviations exceed certain limits or suddenly change or increase within a short period of time, these changes can indicate strong wear or even failure of components.

The terms and associated reference designations given in the list below are used throughout the description, claims, abstract, and in the drawing.

BRIEF DESCRIPTION OF THE DRAWINGS

The invention, its nature as well as its advantages, shall be described in more detail below with the aid of the accompanying drawings. Referring to the drawings.

DETAILED DESCRIPTION OF EXEMPLARY EMBODIMENTS

The same or functionally identical elements are provided with the same designations below. The values and dimensional specifications indicated below are only exemplary values and do not constitute any restriction of the invention to such dimensions.

A practical and effective method of developing gas turbine models according to principles of the present invention will now be described below. The models have a high static and dynamic accuracy over a wide GT operating range. Furthermore, they require only limited numerical calculations and can therefore be implemented, for example, in a gas turbine control system and operated simultaneously with the actual turbine.

The core process of a gas turbine includes compression in the compressor, combustion in the combustion chamber, and expansion in the turbine. These processes take place very quickly and typically last for only a few milliseconds. The dynamics of a thermal gas turbine block depend essentially on the volumes and the metal masses along the thermodynamic process of the gas turbine and on the dynamics of actuators, measurement systems, and rotor dynamics. During transient phases, the volumes store or discharge fuel gas, air and exhaust gas, and metal masses absorb or release heat. Control systems change the positions of actuators based on measured values.

The effects of metal masses on the gas turbine dynamics are of secondary importance compared to those of the volumes. Furthermore, the volumes along the gas turbine process can be "shifted" to the beginning, i.e., compressor inlet, or the end of the gas turbine process, i.e., turbine outlet, without entailing considerable distortion in the behavior of the gas turbine dynamics. The gas turbine process without the volumes and the metal masses can be assumed to be static. Finally, the dynamics of the actuators (e.g., for VIGV=Variable Inlet Guide Vane, fuel control valves), and the measuring instruments (e.g., for speed, turbine outlet temperature, compressor outlet pressure measurements) can be assumed to be linear.

With these assumptions, a gas turbine process model can be divided into a plurality of sub models. These are either "nonlinear but static" or "dynamic but linear". Equation 1, as known from the state of the art, can then be replaced by algebraic equations without derivations on the one hand or linear differential equations on the other hand. This substantially reduces the calculations required to simulate the gas turbine process and the overall gas turbine model remains dynamic and nonlinear.

Figure 1:
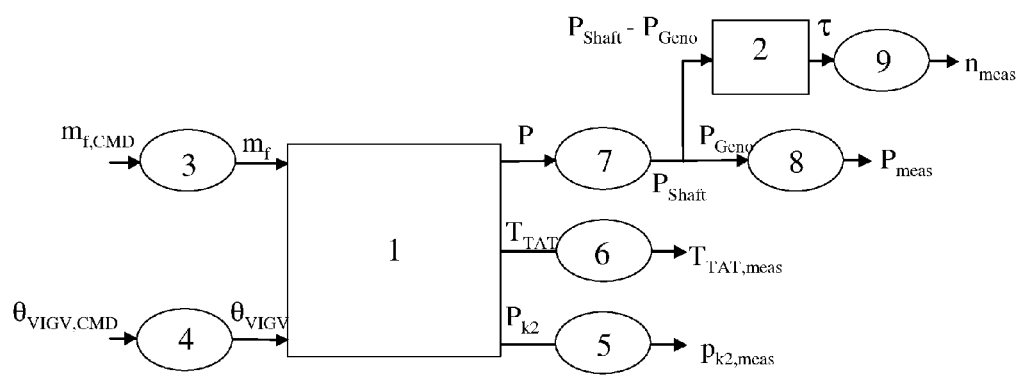
FIG. 1 shows a block diagram of an exemplary embodiment of the gas turbine model according to the present invention.

A process model of a typical gas turbine according to an exemplary embodiment of the invention is shown in the FIG. 1. The model has two input variables, namely the fuel mass flow $m_f$ and the compressor VIGV angle $\theta_{VIGV}$. For gas turbines having an axial compressor, these two input variables are independent and do not affect one another. The model has four output variables, namely the output power P, the shaft speed n, the compressor outlet pressure pk2 and the turbine outlet temperature TAT. For the gas turbines considered by way of example, TIT (=Turbine Inlet Temperature) or other process parameters can be calculated by an algebraic formula from TAT and pk2.

As shown in the FIG. 1 the model of this example has nine sub models. "Static but nonlinear" sub models are indicated by squared symbols, the states of which are described by algebraic equations. "Linear but dynamic" models are indicated by the elliptical sub models symbols. They are Single Input/Single Output systems, the state equations of which can be expressed by Laplace transfer functions.

All the sub models are explained in detail below:
Static Sub Models
There are two static sub models: the static gas turbine sub model 1 and the static shaft kinetic sub model 2.
Static Gas Sub Model 1
The static gas turbine sub model 1 presents a "virtual" gas turbine without volumes and metal masses. It has two input variables: the fuel mass flow $m_f$ and the compressor VIGV angle $\theta_{VIGV}$; and three output variables: the power output P, the temperature after turbine TAT, and the outlet pressure of the compressor pk2. The model calculates the output variables from the input variables through the use of the following equations:

$$p_{k2} = f_{pk2}(\dot{m}_f, \theta_{VIGV}, t) \cdot \qquad \text{Eq. 3}$$
$$\eta_{pk2}\left(\frac{T_{k1}}{T_{k1,ref}}, \frac{p_{amb}}{p_{amb,ref}}, \frac{H_{amb}}{H_{amb,ref}}, \frac{n}{n_{ref}}, \frac{h_{LHV}}{h_{LHV,ref}}, \omega_W, \dots\right),$$

$$P = f_P(\dot{m}_f, p_{k2}, t) \cdot \qquad \text{Eq. 4}$$
$$\eta_P\left(\frac{T_{k1}}{T_{k1,ref}}, \frac{p_{amb}}{p_{amb,ref}}, \frac{H_{amb}}{H_{amb,ref}}, \frac{n}{n_{ref}}, \frac{h_{LHV}}{h_{LHV,ref}}, \omega_W, \dots\right),$$

$$T_{TAT} = f_{TAT}(\dot{m}_f, p_{k2}, t) \cdot \qquad \text{Eq. 5}$$
$$\eta_{TAT}\left(\frac{T_{k1}}{T_{k1,ref}}, \frac{p_{amb}}{p_{amb,ref}}, \frac{H_{amb}}{H_{amb,ref}}, \frac{n}{n_{ref}}, \frac{h_{LHV}}{h_{LHV,ref}}, \omega_W, \dots\right),$$

$f_{pk2}$, $f_p$ and $f_{TAT}$ are functions for calculating the compressor outlet pressure $p_{k2}$, power output P, and the turbine outlet temperature TAT the gas turbine would have at reference working conditions. They are functions of the fuel mass flow $m_f$ the angle of the variable inlet guide vanes $\theta_{VIGV}$, and the time t. These functions $f_{pk2}$, $f_p$, and $f_{TAT}$ are time-variant during the starting of the gas turbine and the warm-up phase or after significant changes in the load settings when noticeable heat flow will be released or absorbed by the metal masses of a gas turbine. Further, the effect of metal temperatures on the clearances inside the turbine can be accounted for by this time dependency. The effect of heat release or absorption can be assumed to be time-invariant once the gas turbine has been operating at steady state for an extended period of time. Typically their influence can be neglected after several hours. Clearances can have a noticeable influence for a longer period of time. Depending on the turbine design and size, up to 10 hours or more might be required for stabilization. However, due to the slow nature of these processes, the changes in them can be neglected during transients and their derivates can be neglected.

The correction functions $\eta_{pk2}$, $\eta_p$ and $\eta_{TAT}$ are used to take into account changes in the operating conditions like the temperature at the compressor inlet $T_{k1}$, the ambient pressure $p_{amb}$, the shaft speed n, the lower heating value of the fuel $h_{LHV}$ or the NOx water (water injected to reduce the NOx emissions) to fuel ratio $\omega_w$. The index ref designates a value at the reference condition. All the other parameters, which indicate a change in the condition of the gas turbine operation, are likewise to be included in these correction functions, for example the water mass flow of a high-fogging system, or the steam mass in case of power augmentation by steam injection, etc.

Static Shaft Kinetic Sub Model 2

The power produced by the gas turbine is either fed into the power grid or used as kinetic power $$P_{Kinetic} = P_{Shaft} - P_{GENO} \qquad \text{Equation 6}$$

to accelerate/decelerate, i.e., to increase or reduce the kinetic energy of the gas turbine shaft, where $P_{Shaft}$ is the quasi-stationary mechanical power output of the gas turbine and $P_{GENO}$ is the electrical power, which is directed into the power grid via the generator plus the generator losses.

The shaft kinetic sub model calculates the shaft torque $$\tau = \frac{P_{Kinetic}}{n} = \frac{P_{Shaft} - P_{GENO}}{n} \qquad \text{Equation 7}$$

as a function of the acceleration power and the shaft speed (n).

Dynamic Sub Models

There are seven linear but dynamic sub models. They are all Single Input/Single Output systems and can be expressed by Laplace transfer functions.

Fuel Dynamics Sub Model 3

This model represents the dynamics between the fuel mass flow command $\dot{m}_{f,CMD}$ and the fuel mass flow $\dot{m}_f$, $$\dot{m}_f(s) = G_{FUEL}(s) \cdot \dot{m}_{f,CMD}(s) \qquad \text{Equation 8,}$$

which is actually injected into the combustion chamber and includes the time delay in the control system (CPU cycle time, the I/O card scanning time, etc.) and the dynamics of the fuel distribution system (FDS).

$G_{FUEL}$ is the transfer function of the fuel dynamics sub model 3 and can be approximated by a first-order system with a time delay as follows:

$$G_{FUEL}(s) = \frac{1}{1 + T_{FUEL}s} e^{-L_{FUEL}s}, \qquad \text{Equation 9}$$

where $L_{FUEL}$ is the sum of the time delay in the control system and the fuel "transfer" time from the control valve to the combustion chamber, and $T_{FUEL}$ is the time constant of the fuel distribution system (FDS), which depends on its volume, pressure in the system and the physical properties of the fuel.

Air Dynamics Sub Model 4

This model simulates the dynamics of the variable inlet guide vanes VIGV, and of the compressor.

$$\theta_{VIGV}(s) = G_{AIR}(s)\theta_{VIGV,CMD}(s) \qquad \text{Equation 10}$$

$G_{AIR}(s)$ designates the transfer function between the VIGV command $\theta_{VIGV,CMD}$ and a virtual VIGV angle $\theta_{VIGV}$ at the combustion chamber inlet. The $\theta_{VIGV}$ is different from the actual VIGV angle $\theta_{VIGV,REAL}$ as it includes the dynamic influence of the compressor volume. With $\theta_{VIGV,REAL}$ as the variable in front of the volume, $\theta_{VIGV}$ is a variable after the volume. With the transfer function of the volume of the compressor $G_{CPRSR}$, the relation between real and virtual VIGV angle becomes:

$$\theta_{VIGV}(s) = G_{CPRSR}(s)\theta_{VIGV,REAL}(s) \qquad \text{Equation 11.}$$

$G_{AIR}(s)$ of equation 11 includes the time delay in the control system, the dynamics of the VIGV actuators and the dynamics of the compressor volume. It can be approximated by a second-order system together with a time delay as:

$$G_{AIR}(s) = \frac{1}{(1 + T_{VIGV} \cdot s)(1 + T_{CPRSR} \cdot s)} e^{-L_{AIR} \cdot s}, \qquad \text{Equation 12}$$

where $L_{AIR}$ includes the time delay in the control system and the air "transfer" time through the compressor. $T_{VIGV}$ is the time constant of the control system and VIGV actuator, and $T_{CPRSR}$ is dependent on the volume of the compressor.

$p_{k2}$ Dynamics Sub Model

This Model Simulates Dynamics of the Pressure Measurement at the Compressor Exit or the compressor plenum. It can be written as:

$$p_{k2,MEAS}(s) = G_{pk2}(s)p_{k2}(s) \qquad \text{Equation 13,}$$

with the transfer function $G_{pk2}(s)$ between the actual pressure at compressor exit or compressor plenum $p_{k2}$ and the measured value $p_{k2,MEAS}$. $G_{pk2}(s)$ can be approximated by a first-order system with a time delay:

$$G_{pk2}(s) = \frac{1}{1 + T_{pk2}s} e^{-L_{pk2}s} \qquad \text{Equation 14}$$

$L_{pk2}$ is the time delay in the control system. $T_{pk2}$ is the time constant of the pressure measurement.

TAT Dynamics Sub Model 6

This model represents the dynamics of the measurement of the turbine outlet temperature TAT:

$$T_{TAT,MEAS}(s) = G_{TAT}(s)T_{TAT}(s) \qquad \text{Equation 15,}$$

where $G_{TAT}$ is the transfer function between the virtual turbine outlet temperature $T_{TAT}$, which is a result of the static gas turbine sub model 1, and the measured TAT $T_{TAT,MEAS}$. Due to the dynamics of the measurement system, which typically is mainly the slow response of thermocouples, it differs from the actual turbine outlet temperature $T_{TAT,REAL}$. Analogous to the treatment of the variable inlet guide vane angle of the compressor, the volumes of the combustion chamber and of the turbine are virtually shifted to the end of the process.

$G_{TAT}$ therefore includes the dynamics of the combustion chamber and turbine on account of their volumes and the dynamics of the turbine outlet temperature measurement. It can be approximated by a second-order system together with a time delay as:

$$G_{TAT}(s) = \frac{1}{(1+T_{CT}s)(1+T_{MT}s)} e^{-L_{TAT}s} \qquad \text{Equation 16}$$

where $L_{TAT}$ is the sum of the time delays in the control system and the exhaust gas "transfer" time through the combustion chamber and the turbine. $T_{MT}$ is the time constant of the TAT measurement. The time constant $T_{CT}$ is dependent on the volumes in the combustion chamber and the turbine.

Power Dynamics Sub Model 7

This model simulates the dynamics between virtual power of the static gas turbine sub model 1 and the power at the shaft $P_{Shaft}$. Similar to virtual turbine outlet temperature $T_{TAT}$, P is the virtual power output of the static gas turbine sub model, in which the volumes of the combustion chamber and turbine are disregarded. The physical shaft power $$P_{Shaft}(s) = G_P(s)P(s) \qquad \text{Equation 17}$$

is the product of the virtual power and the transfer function $G_p(s)$, which describes the dynamics of the combustion chamber and turbine on the basis of their volumes. It can be approximated by a first-order system.

$$G_P(s) = \frac{1}{1+T_P s} \qquad \text{Equation 18}$$

In this context the shaft power is defined as the mechanical power at the gas turbine shaft plus the power needed to accelerate or decelerate the shaft during transients.

Power Measurement Dynamics Sub Model 8

This model simulates the dynamics of the power measurement:

$$P_{MEAS}(s) = G_E(s)P_{GENO}(s) \qquad \text{Equation 19}$$

where $G_E(s)$ is the transfer function between the power output of the generator $P_{GENO}$ to the electric grid and the measured power output $P_{MEAS}$. It can be approximated by a first-order system together with a time delay:

$$G_E(s) = \frac{1}{1+T_E s} e^{-L_E s} \qquad \text{Equation 20}$$

where $L_E$ is the sum of the delay times in the control system and in the power measurement, and $T_E$ is the time constant of the power measurement.

Shaft Dynamics Sub Model 9

The shaft acceleration is calculated by the following equation:

$$\frac{dn(t)}{dt} = \frac{\tau}{J}, \qquad \text{Equation 21}$$

where J is the moment of inertia. Using Lapace transformation the shaft speed can be written as:

$$n(s) = \frac{1}{Js}\tau(s). \qquad \text{Equation 22}$$

The shaft dynamics sub model simulates the dynamics between the shaft torque and the measured speed $n_{MEAS}$:

$$n_{MEAS}(s) = G_{Shaft}(s)\tau(s) \qquad \text{Equation 23.}$$

The transfer function $G_{Shaft}(s)$ can be approximated as:

$$G_{Shaft}(s) = \frac{e^{-L_{Shaft}s}}{Js}, \qquad \text{Equation 24}$$

where $L_{Shaft}$ is the sum of the delay time in the control system and in the speed measurement.

Closing of the System of Equations

To solve the model system as shown in FIG. 1, the difference between gas turbine shaft power $P_{shaft}$ and generator power $P_{GENO}$ is not defined. Either the difference between the two, $P_{shaft} - P_{GENO}$, has to be given as additional input or one of the output variables, measured speed $n_{meas}$ or measured power $P_{meas}$, has to be given as additional input.

During run up to idle and idle operation, when the generator is not connected to the grid, the generator power becomes zero and the system is closed.

Figure 2:
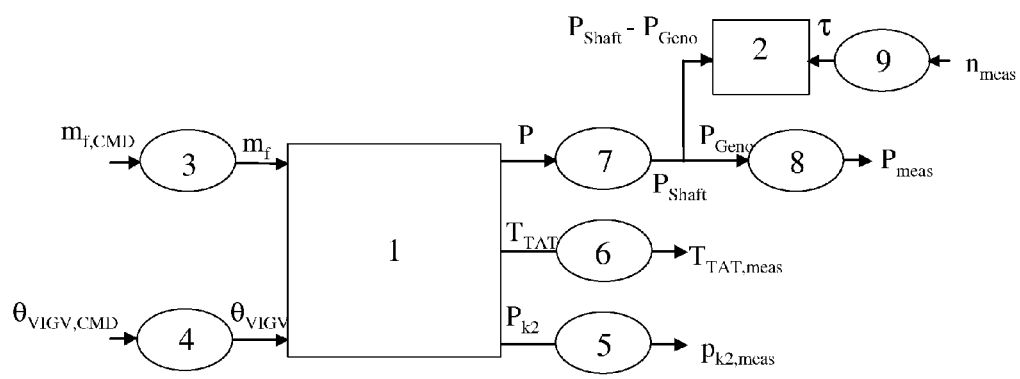
FIG. 2 shows a block diagram of an exemplary embodiment of the gas turbine model according to the present invention, which uses the rotational speed as an additional input.

For simulation of normal load operation typically the measured speed is used as an additional input and a slightly modified model as shown in FIG. 2 applies. The differences from the model shown in FIG. 1 are:

the use of the measured speed as an input to the shaft dynamic sub model 9, which is now used to calculate the corresponding torque τ; and the use of the torque τ as input to the static shaft kinetic sub model 2, which is now used to calculate the corresponding acceleration power required to accelerate or decelerate the shaft and which is identical to the difference between shaft and generator power $P_{shaft} - P_{GENO}$.

Model Identification

The formulae in the static gas turbine sub model are approximated by polynomials. The coefficients of the polynomials are identified through use of the gas turbine data obtained for steady state operation. The steady state gas turbine data are either measurement results from a real gas turbine or results of a detailed model or a combination of both.

The parameters in the transfer function of the dynamics sub model can be identified through use of step response data. These can either be obtained by step response tests, which are carried out on a real gas turbine or by simulation of step responses on a detailed dynamic gas turbine model.

Exemplary embodiments described above and in the drawings disclose to a person skilled in the art embodiments which differ from the exemplary embodiments and which are contained in the scope of the invention.

For example, two dynamic sub models could replace the air dynamics sub model 4. A first one would take into account the dynamics of the variable inlet guide vanes with their controls and actuators to calculate the real variable inlet guide vane position $$\theta_{VIGV,REAL}(s) = G_{AIR}(s)\theta_{VIGV,CMD}(s) \qquad \text{Equation 24}$$

based on the commanded variable inlet guide vane position. For use as an input variable for the static gas turbine sub model 1, the real variable inlet guide vane position then has to be converted into the virtual variable inlet guide vane position $\theta_{VIGV}$ according to equation 11.

As another example, the real turbine outlet temperature is needed rather than a measured one, when simulating fast transients, which might occur during the operation of a combined cycle power plant. This real turbine outlet temperature can be used as input for the design, simulation and operation of the boiler and steam cycle. To obtain this real turbine outlet temperature, the dynamic TAT sub model 6 might be spit into two sub models, with a first model to calculate the real turbine outlet temperature $T_{TAT,REAL}$ according to equation 17 and a second model to calculate the measured turbine outlet temperature $T_{TAT,MEAS}$. Alternatively, an additional model to calculate the real turbine outlet temperature $T_{TAT,REAL}$ in parallel with the proposed dynamic TAT sub model 6 can be introduced.

For the simulation of gas turbines with sequential combustion or multi shaft turbines, corresponding modifications of the model are required. For example a second fuel dynamics sub model or a second static shaft kinetic sub model with a second shaft dynamics sub model, etc., as well as corresponding modifications in the static gas turbine sub model, are needed.

Numerical models embodying principles of the present invention are advantageously embodied in a set of logical instructions, e.g., software, which is in a memory device in or accessible by a general purpose computer or a dedicated controller for a gas turbine, which when executed by the computer or controller performs the calculations and generates the outputs as described herein to model the operation of a gas turbine.

DESIGNATIONS

1 static gas turbine sub model
2 static shaft kinetic sub model
3 Fuel dynamics sub model
4 Air dynamics sub model
5 PK2 dynamics sub model
6 TAT dynamics sub model
7 Power dynamics sub model
8 Power measurement dynamics sub model
9 Shaft dynamics sub model
CV Control valve
FDS Fuel distribution system
GENO Generator
GT Gas turbine
PK2 Compressor outlet pressure
TAT Temperature after turbine
TIT Turbine inlet temperature
$m_f$ fuel mass flow
$m_{f,cmd}$ commanded fuel mass flow
$n_{meas}$ measured speed
P power
$P_{Geno}$ generator power
$P_{meas}$ measured generator power
$P_{shaft}$ shaft power
$T_{CT}$ time constant of the TAT measurement.
$T_{MT}$ time constant of the volumes in the combustor and turbine
$T_{TAT}$ virtual turbine outlet temperature
$T_{TAT,meas}$ measured turbine outlet temperature
VIGV variable inlet guide vane
$\theta_{VIGV}$ virtual variable inlet guide vane position
$\theta_{VIGV,cmd}$ commanded variable inlet guide vane position
$\theta_{VIGV,real}$ variable inlet guide vane position While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A numerical modeling system of a gas turbine for transient and steady state simulation, producing at least one process parameter, the system comprising:
   a computer or controller, and a memory device accessible by the computer or controller; and
   a numerical model stored in the memory device comprising at least one dynamic sub model which simulates a dynamic influence of volumes, actuators, and/or measurement systems, and/or rotor dynamics, and at least one static sub model which simulates the gas turbine disregarding said volumes, dynamics of actuators, measurements, and rotor dynamics of the gas turbine simulated by said at least one dynamic sub model,
   wherein the at least one dynamic sub model includes at least one dynamic input sub model which models the dynamic influence of volumes and/or measurement systems, and generates an input variable for the at least one static sub model from a control variable of the gas turbine.

2. A modeling system according claim 1, wherein the at least one dynamic sub model includes at least one dynamic output sub model which models the dynamic influence of volumes and/or measurement systems, and/or rotor dynamics, and generates through simulation real or measured output variables based on output variables of the static sub model.

3. A modeling system according to claim 1, wherein the numerical model is configured and arranged to neglect the dynamic influence of metal masses on a heat balance of the gas turbine.

4. A modeling system according to claim 1, wherein:
   the at least one dynamic sub model comprises linear differential equations which are solved by Laplace Transformation; and the numerical model comprises a single input, single output equation in the Laplace transformed form.

5. A modeling system as claimed in claim 1, further comprising:
   two input sub models of which one generates a first input variable, said first input variable corresponding to a fuel mass flow, and the other of said two input sub models generates a second input variable, said second input variable corresponding to an angle of a variable inlet guide vane controller.

6. A modeling system as claimed in claim 5, wherein the static gas turbine model is configured and arranged to generate a first output variable which corresponds to a pressure at a compressor outlet using the first and second input variables.

7. A modeling system as claimed in claim 6, wherein the static gas turbine model is configured and arranged to generate a second output variable which corresponds to a power output of the gas turbine using the first and second input variables obtained from the input sub models and the first output variable of the static gas turbine model.

8. A modeling system as claimed in claim 6, wherein the static gas turbine model is configured and arranged to generate a third output variable which corresponds to a turbine outlet temperature using the first and second input variables obtained from the input sub models and the first output variable of the static gas turbine model.

9. A method for real time simulation of a real gas turbine, the method comprising:
   using a gas turbine modeling system according to claim 1; and
   inputting results from the modeling as control settings of the real gas turbine.

10. A method according to claim 9, further comprising:
    adjusting the control settings to increase cycle efficiency, increase component life, reduce emissions, or combinations thereof.

11. A method according to claim 9, further comprising:
    adjusting the control settings to realize fast transients, improve control accuracy, or both.

12. A method according to claim 9, further comprising:
    monitoring the gas turbine based at least on deviations between model results and real gas turbine data.

13. A method of creating a model for simulating operation of a gas turbine, the method comprising:
    splitting the process of the gas turbine into at least one dynamic and at least one static sub process parts,
    wherein the at least one dynamic process part serves two functions:
       wherein a first of the two functions comprises transferring data in real time to a virtual, quasi steady state input comprising a steady state model input plus input for simulating the time dependency of heat transfer into and out of metal masses of the gas turbine for the at least one static sub process; and
       wherein a second of the two functions comprises transferring virtual quasi steady state output data back into real time; and
    wherein the at least one static sub process part models the gas turbine under virtual steady state conditions.

14. A numerical modeling system of a gas turbine for transient and steady state simulation, producing at least one process parameter, the system comprising:
    a computer or controller, and a memory device accessible by the computer or controller; and
    a numerical model stored in the memory device comprising at least one dynamic sub model which simulates a dynamic influence of volumes, actuators, and/or measurement systems, and/or rotor dynamics, and at least one static sub model which simulates the gas turbine disregarding said volumes, dynamics of actuators, measurements, and rotor dynamics of the gas turbine simulated by said at least one dynamic sub model,
    wherein the at least one dynamic sub model includes at least one dynamic output sub model, which models the dynamic influence of volumes and/or measurement systems, and/or rotor dynamics, and generates through simulation real or measured output variables based on output variables of the static sub model.

* * * * *